(12) United States Patent
Shikagawa et al.

(10) Patent No.: US 9,021,873 B2
(45) Date of Patent: May 5, 2015

(54) BRAKE ABNORMALITY DIAGNOSIS METHOD AND BRAKE ABNORMALITY DIAGNOSIS DEVICE

(71) Applicant: Fanuc Corporation, Minamitsuru-gun, Yamanashi (JP)

(72) Inventors: Tsutomu Shikagawa, Yamanashi (JP); Yasuyuki Matsumoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/887,826

(22) Filed: May 6, 2013

(65) Prior Publication Data

US 2014/0000355 A1    Jan. 2, 2014

(30) Foreign Application Priority Data

Jun. 28, 2012   (JP) ................................. 2012-145625

(51) Int. Cl.
| | |
|---|---|
| *G01M 19/00* | (2006.01) |
| *G01M 13/00* | (2006.01) |
| *G01L 5/28* | (2006.01) |
| *B25J 9/16* | (2006.01) |
| *G05B 19/406* | (2006.01) |

(52) U.S. Cl.
CPC ................. *G01M 13/00* (2013.01); *G01L 5/28* (2013.01); *B25J 9/1674* (2013.01); *G05B 19/406* (2013.01); *G05B 2219/41279* (2013.01)

(58) Field of Classification Search
USPC .......................................................... 73/121
See application file for complete search history.

(56) References Cited

U.S. PATENT DOCUMENTS

| | | | |
|---|---|---|---|
| 6,711,946 B2 * | 3/2004 | Hofmann | 73/121 |
| 6,778,867 B1 | 8/2004 | Ziegler et al. | |
| 7,578,373 B2 * | 8/2009 | Shiratsuki et al. | 187/391 |
| 8,069,714 B2 * | 12/2011 | Ortmaier et al. | 73/121 |
| 8,359,915 B2 * | 1/2013 | Whatley | 73/121 |
| 8,686,670 B2 * | 4/2014 | Verheyen et al. | 318/372 |
| 2002/0069697 A1 * | 6/2002 | Hofmann | 73/116 |
| 2007/0187367 A1 | 8/2007 | Kita et al. | |
| 2008/0218115 A1 | 9/2008 | Hamabata et al. | |
| 2010/0058850 A1 * | 3/2010 | Ortmaier et al. | 73/121 |
| 2010/0154527 A1 * | 6/2010 | Illan | 73/121 |

(Continued)

FOREIGN PATENT DOCUMENTS

| | | |
|---|---|---|
| CN | 101020292 A | 8/2007 |
| CN | 101224831 A | 7/2008 |

(Continued)

OTHER PUBLICATIONS

Office Action dated May 20, 2014, corresponds to German patent application No. 102013010406.8.

(Continued)

*Primary Examiner* — Eric S McCall
(74) *Attorney, Agent, or Firm* — Lowe Hauptman & Ham, LLP (57) ABSTRACT

A brake abnormality diagnosis device which diagnoses an abnormality in a brake of a brake-equipped motor provided in a robot or a machine tool, includes: an abnormality diagnosis unit which performs a diagnosis as to whether or not there is an abnormality in the brake, while the motor is excited and the brake is activated; and an output unit which, if it is diagnosed that there is an abnormality in the brake, notifies the abnormality in the brake without interrupting the excitation of the motor and without releasing the brake.

8 Claims, 8 Drawing Sheets

(56) References Cited

U.S. PATENT DOCUMENTS

| | | | |
|---|---|---|---|
| 2011/0219863 A1* | 9/2011 | Whatley | 73/121 |
| 2011/0245970 A1 | 10/2011 | Wells et al. | |
| 2012/0060597 A1* | 3/2012 | Lee et al. | 73/121 |
| 2012/0193174 A1 | 8/2012 | Kigawa et al. | |
| 2012/0227479 A1* | 9/2012 | Windlin | 73/121 |
| 2013/0055806 A1* | 3/2013 | Whatley | 73/121 |

FOREIGN PATENT DOCUMENTS

| | | |
|---|---|---|
| CN | 101261510 A | 9/2008 |
| CN | 201324965 Y | 10/2009 |
| DE | 102006022889 A1 | 11/2007 |
| DE | 102008015948 A1 | 10/2009 |
| DE | 102008015949 A1 | 10/2009 |
| DE | 102008024950 A1 | 11/2009 |
| DE | 102008041866 B3 | 4/2010 |
| DE | 102010007025 A1 | 8/2011 |
| DE | 102010020750 A1 | 11/2011 |
| DE | 102010024478 A1 | 12/2011 |
| EP | 1304604 A2 | 4/2003 |
| EP | 1662351 A2 | 5/2006 |
| JP | 6-246674 A | 9/1994 |
| JP | 11-196595 A | 7/1999 |
| JP | 3001159 B | 1/2000 |
| JP | 2003-032879 A | 1/2003 |
| JP | 2005-170551 A | 6/2005 |
| JP | 2006-154998 A | 6/2006 |
| JP | 2010-049361 A | 3/2010 |
| WO | 2004059494 A1 | 7/2004 |
| WO | 2007079950 A1 | 7/2007 |
| WO | 2008/155853 A1 | 12/2008 |

OTHER PUBLICATIONS

Office Action mailed May 26, 2014, corresponds to Chinese patent application No. 201310220443.7.

* cited by examiner

BRAKE ABNORMALITY DIAGNOSIS METHOD AND BRAKE ABNORMALITY DIAGNOSIS DEVICE

RELATED APPLICATIONS

The present application is based on, and claims priority from, Japanese Application Number 2012-145625, filed Jun. 28, 2012, the disclosure of which is hereby incorporated by reference herein in its entirety.

BACKGROUND OF THE INVENTION

1. Field of the Invention

The present invention relates to a brake abnormality diagnosis method for an industrial robot or a machine tool having a brake-equipped motor, and to a brake abnormality diagnosis device which implements such a method.

2. Description of Related Art

Industrial robots and machine tools having a gravity axis (hereinafter, in some cases industrial robots and machine tools are together referred to as a "robot") include a brake-equipped motor. If the motor is interrupted, the brake is used in order to maintain the posture of the robot.

However, if adherent matter such as grease or oil adheres to a friction plate of the brake provided in the motor, the braking torque of the brake decreases. If there is a substantial decrease in the braking torque, it is no longer possible for the robot to maintain the posture thereof when the excitation of the motor is interrupted.

If this kind of situation occurs when, for example, gravitational force is acting on an output axis of the motor, in other words when the axis is a gravity axis, the gravity axis may drop. Therefore, it is desirable for the decrease in the braking torque of the brake to be regularly diagnosed.

In Japanese Unexamined Patent Publication No. 06-246674, coasting distance of a robot from a generation of an emergency stop signal for the robot to an emergency stop of the robot is detected, and it is determined that there is an abnormality in the brake if this coasting distance is greater than a reference distance. Furthermore, in Japanese Unexamined Patent Publication No. 06-246674, when power is supplied, if torque corresponding to a predetermined braking-torque reference value is generated in the motor of the robot and the rotation of the motor is equal to or greater than a reference value, it is determined that there is an abnormality in the brake.

Usually, once the robot is powered on, the robot is repeatedly activated and stopped without the power supply being interrupted all day long. There are cases where there is a gradual decrease in the braking torque of the brake due to adherent matter such as grease or oil adhering to the friction plate of the brake as a result of the robot being repeatedly activated and stopped.

In Japanese Unexamined Patent Publication No. 06-246674, brake abnormality determination is performed when the robot is made to perform an emergency stop and when the robot is powered on. Therefore, even though brake abnormalities can be discovered at times such as when the robot is made to perform an emergency stop, there are cases when the decrease in braking torque has progressed to a considerable extent at the time of discovering an abnormality. Therefore, if there is a substantial decrease in the braking torque and the axis is a gravity axis, the gravity axis may drop.

The present invention has been devised in light of such circumstances, and an object of the present invention is to provide a brake abnormality diagnosis method with which a dropping of a gravity axis due to a decrease in a braking torque of a brake can be prevented, and to provide a brake abnormality diagnosis device which implements such a method.

SUMMARY OF THE INVENTION

According to a first aspect for achieving the aforementioned object, provided is a brake abnormality diagnosis method for diagnosing an abnormality in a brake of a brake-equipped motor provided in a robot or a machine tool, comprising steps of: diagnosing whether or not there is the abnormality in the brake is performed while the motor is excited and the brake is activated; and notifying the abnormality in the brake if it is diagnosed that there is the abnormality in the brake, without interrupting the excitation of the motor and without releasing the brake.

According to a second aspect, in the first aspect, if it is diagnosed that there is the abnormality in the brake, further the robot or the machine tool is moved to a safe predetermined retreat position and posture.

According to a third aspect, in the first aspect, if it is diagnosed that there is the abnormality in the brake, further the operation of the robot or the machine tool is continued while the operating speed of the robot or the machine tool is decreased by a predetermined amount.

According to a fourth aspect, in any of the first to third aspects, diagnosis as to whether or not there is the abnormality in the brake is performed at least before a movement instruction for the robot or the machine tool is output or after the movement instruction for the robot or the machine tool has stopped.

According to a fifth aspect, in the fourth aspect, if it is diagnosed that there is the abnormality in the brake before the operation of the robot or the machine tool is started, an operation start sequence for the robot or the machine tool is continued.

According to a sixth aspect, in the first aspect, diagnosis as to whether or not there is the abnormality in the brake is performed on the basis of a predetermined movement instruction which is supplied to the motor, and an actual position of the motor which has operated in accordance with the movement instruction.

According to a seventh aspect, provided is a brake abnormality diagnosis device which diagnoses an abnormality in a brake of a brake-equipped motor provided in a robot or a machine tool, comprising: an abnormality diagnosis unit which diagnoses whether or not there is the abnormality in the brake while the motor is excited and the brake is activated; and an output unit which notifies the abnormality in the brake if it is diagnosed that there is the abnormality in the brake without interrupting the excitation of the motor and without releasing the brake.

According to an eighth aspect, in the seventh aspect, the abnormality diagnosis unit diagnoses whether or not there is the abnormality in the brake at least before a movement instruction for the robot or the machine tool is output or after the movement instruction for the robot or the machine tool has stopped.

According to a ninth aspect, in the eighth aspect, if it is diagnosed that there is the abnormality in the brake before the operation of the robot or the machine tool is started, an operation start sequence for the robot or the machine tool is continued.

According to a tenth aspect, in the seventh aspect, diagnosis as to whether or not there is the abnormality in the brake is performed on the basis of a predetermined movement instruction which is supplied to the motor, and an actual position of the motor which has operated in accordance with the movement instruction.

These purposes, features, and benefits of the present invention and other purposes, features, and benefits will be further clarified from a detailed description of a typical mode of embodiment of the present invention which is depicted in the appended drawings.

DETAILED DESCRIPTION

Embodiments of the present invention will be described hereinafter with reference to the accompanying drawings. Like reference symbols are appended to like members in the following drawings. The scale has been appropriately altered in these drawings to facilitate understanding.

Figure 1A:
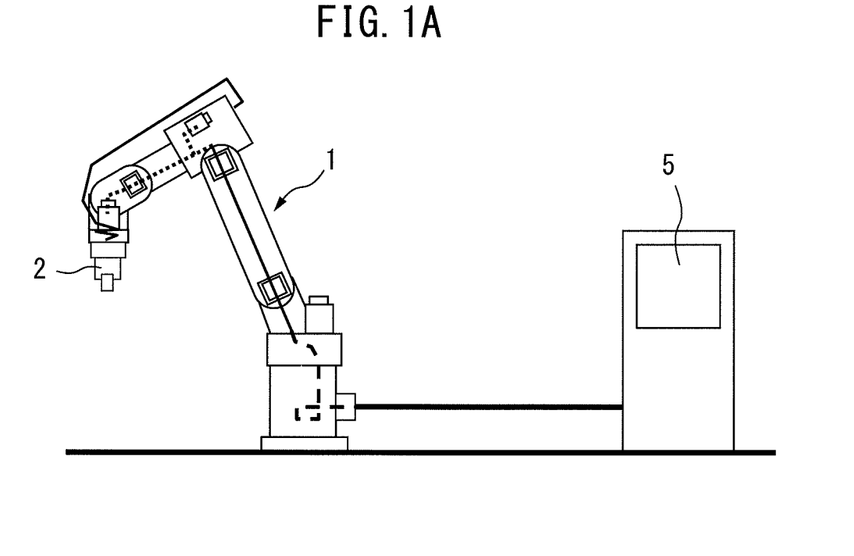
FIG. 1A is a drawing depicting an entire configuration of a robot provided with a brake-equipped motor based on the present invention.

FIG. 1A is a drawing depicting an entire configuration of a robot provided with a brake-equipped motor based on the present invention. An industrial robot 1 which is depicted in FIG. 1A is a six-axis vertical articulated robot. A wrist 2 positioned at the tip end of the robot 1 is mounted with six degrees of freedom. The axes of the robot 1 are internally equipped with servomotors (not depicted in FIG. 1) for driving the axes. The servomotors are connected to a controller 5 by means of a control cable extending from each of the servomotors, and the servomotors are controlled by the controller 5. Furthermore, brakes which are not depicted are attached to the servomotors, and a braking action is applied to the corresponding servomotor.

Figure 1B:
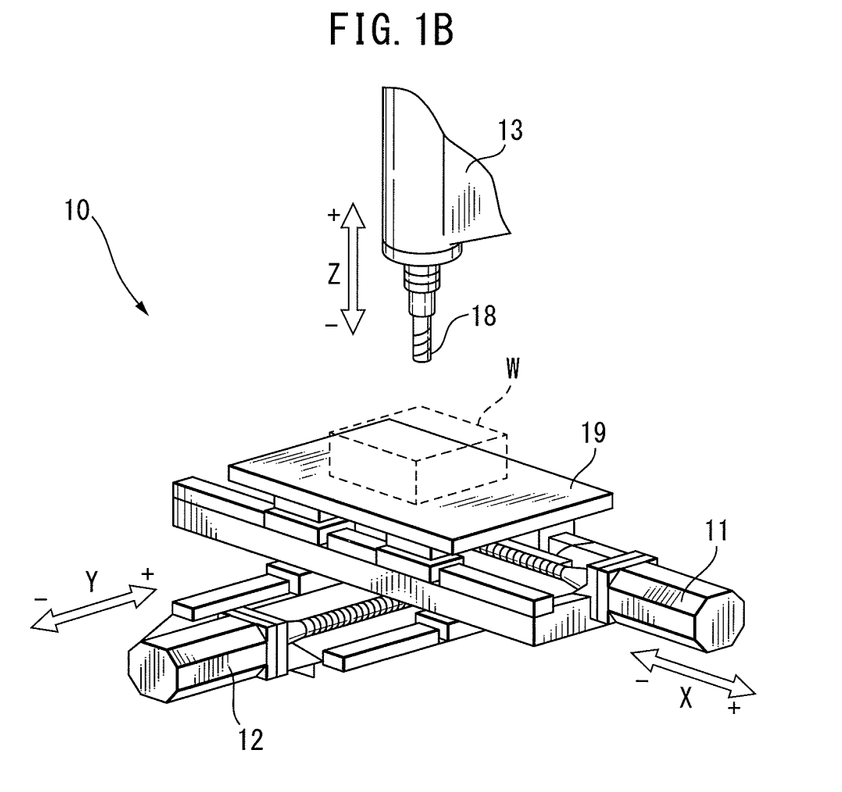
FIG. 1B is a partial perspective view of a machine tool provided with a brake-equipped motor based on the present invention.

FIG. 1B is a partial perspective view of a machine tool provided with a brake-equipped motor based on the present invention. A machine tool 10 depicted in FIG. 1B includes a workpiece, a motor 11 that drives a table 19 which retains the workpiece W, in the X-axis direction, and a motor 12 which drives the table 19 in the Y-axis direction. Furthermore, the machine tool 10 includes a motor 13 that drives a machining head 18 such as a drill in the Z-axis direction. It should be noted that a configuration in which the table 19 is moved by the motor 13 in the Z-axis direction instead of a movement of the machining head 18 may also be implemented. In addition, the machine tool 10 is also connected to a controller which is not depicted.

Figure 2:
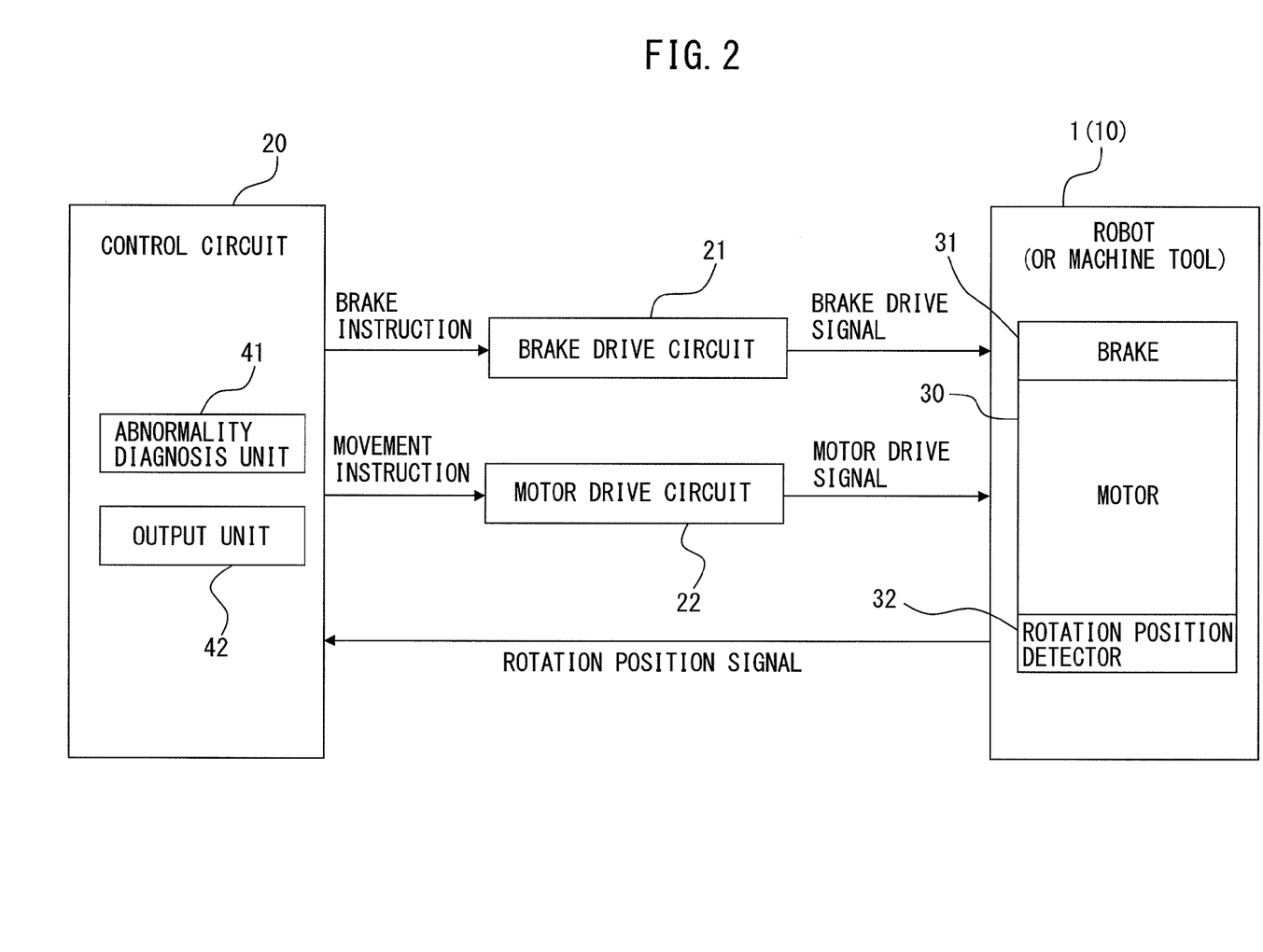
FIG. 2 is a function block diagram for a robot or a machine tool.

FIG. 2 is a function block diagram for a robot or a machine tool. In FIG. 2, one servomotor from among the plurality of servomotors of the robot 1 or the motor 13 of the machine tool 10 is depicted as servomotor 30. The servomotor 30 is provided with a brake 31 that applies a braking action to the rotation of the output axis of a servomotor 30. Furthermore, a rotation position detector 32, such as an encoder, that detects the rotation position of the output axis of the servomotor 30 is attached to the servomotor 30. As depicted in FIG. 2, the rotation position of the output axis detected by the rotation position detector 32 is input to a control circuit 20 of the controller 5 as a rotation position signal.

The control circuit 20 creates a brake instruction and inputs the brake instruction to a brake drive circuit 21. The brake drive circuit 21 converts the brake instruction into a brake drive signal, and inputs the brake drive signal to the brake 31 of the robot 1 or machine tool 10. Furthermore, the control circuit 20 creates a movement instruction and inputs the movement instruction to a motor drive circuit 22. The motor drive circuit 22 converts the movement instruction into a motor drive signal, and inputs the motor drive signal to the servomotor 30 of the robot 1 or the machine tool 10.

Furthermore, the control circuit 20 includes an abnormality diagnosis unit 41 that performs an abnormality diagnosis on the brake 31 in a manner that is described hereinafter. Furthermore, the control circuit 20 includes an output unit 42 that notifies an abnormality of the brake 31 to an operator in an audible or visual manner if an abnormality is detected as a result of the abnormality diagnoses. The output unit 42 is a monitor, a speaker, or a printer for example.

Figure 3:
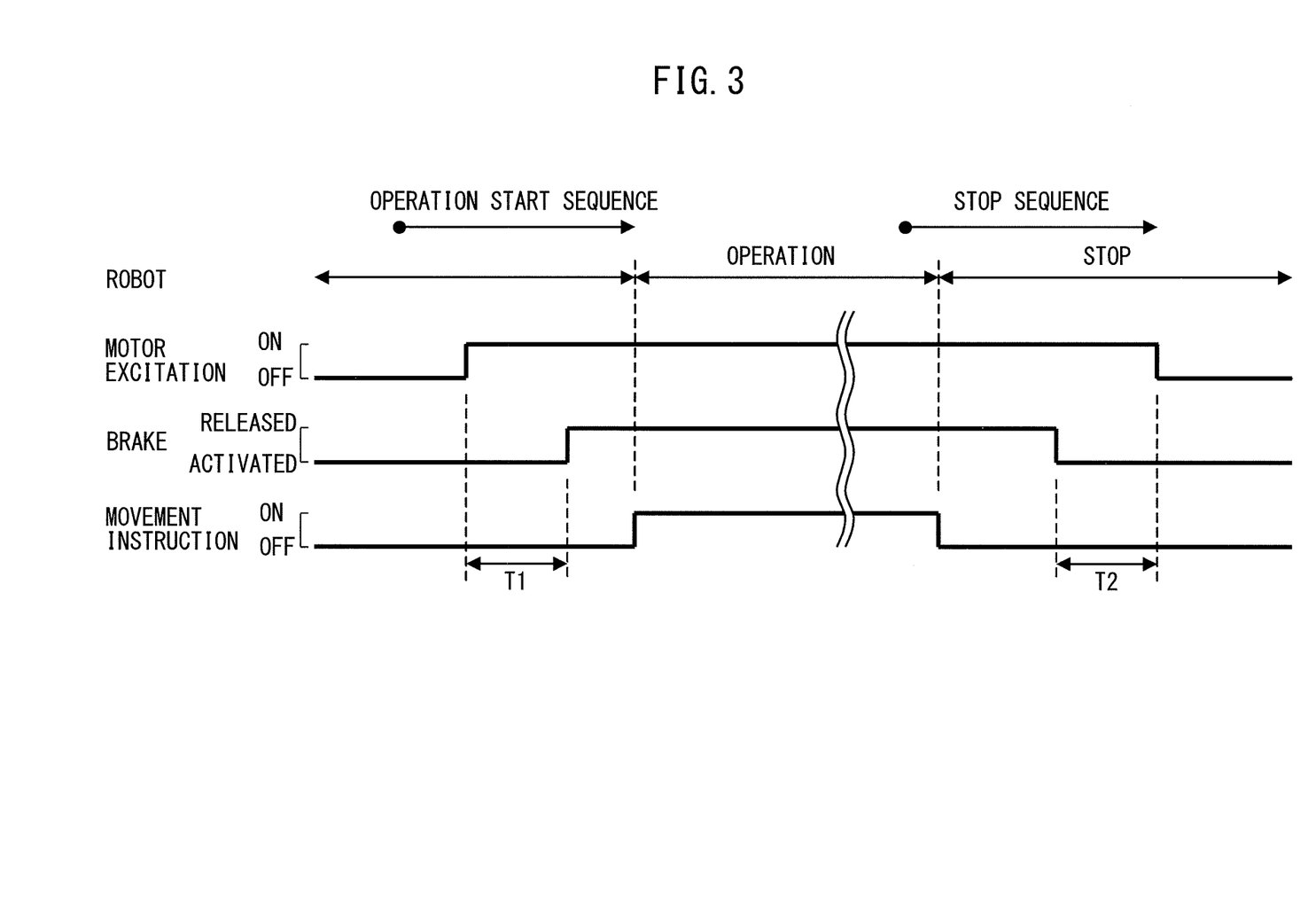
FIG. 3 is an operation-start and operation-stop time chart for an industrial robot.

FIG. 3 is an operation-start and operation-stop time chart for an industrial robot. FIG. 3 and the drawings thereafter describe the operation of the industrial robot 1 depicted in FIG. 1A, and this description is mostly the same for the machine tool 10 depicted in FIG. 1B. FIG. 3 mainly depicts an operation start sequence in which operation is started from a state where the robot 1 has stopped, and a stop sequence in which operation is stopped from a state where the robot 1 is operating.

Furthermore, in the operation start sequence and stop sequence depicted in FIG. 3, the controller 5 of the robot 1 has already been powered on and the robot 1 is in an energized state. Therefore, the operation start sequence and stop sequence are repeatedly performed while the robot 1 is energized.

As depicted in FIG. 3, in the operation start sequence, first the excitation of the servomotor 30 is set to ON by the control circuit 20. Then, a brake drive signal is input to the brake 31 by way of the brake drive circuit 21, and the brake 31 is thereby altered from an activated state to a released state. It consequently is possible for the output axis of the servomotor 30 to operate. Thereafter, a motor drive signal is input as a movement instruction to the servomotor 30 by way of the motor drive circuit 22. The servomotor 30 is therefore driven and the robot 1 starts to operate.

In contrast to this, in the stop sequence, first a zero movement instruction is input to the servomotor 30 or the movement instruction is no longer input to the servomotor 30. Then, the brake 31 is altered from the released state to the activated state, and the output axis of the servomotor 30 is therefore stationary. Thereafter, the excitation of the servomotor 30 is set to OFF and the servomotor 30 stops, and as a result the robot 1 stops.

As depicted in FIG. 3, segments T1, T2 are set in the operation start sequence and stop sequence, respectively. In these segments T1, T2, motor excitation is set to ON and the brake 31 is in the activated state. In the present invention, the abnormality diagnosis unit 41 performs a diagnosis on the brake 31 in at least one of these segments T1, T2.

Figure 4A:
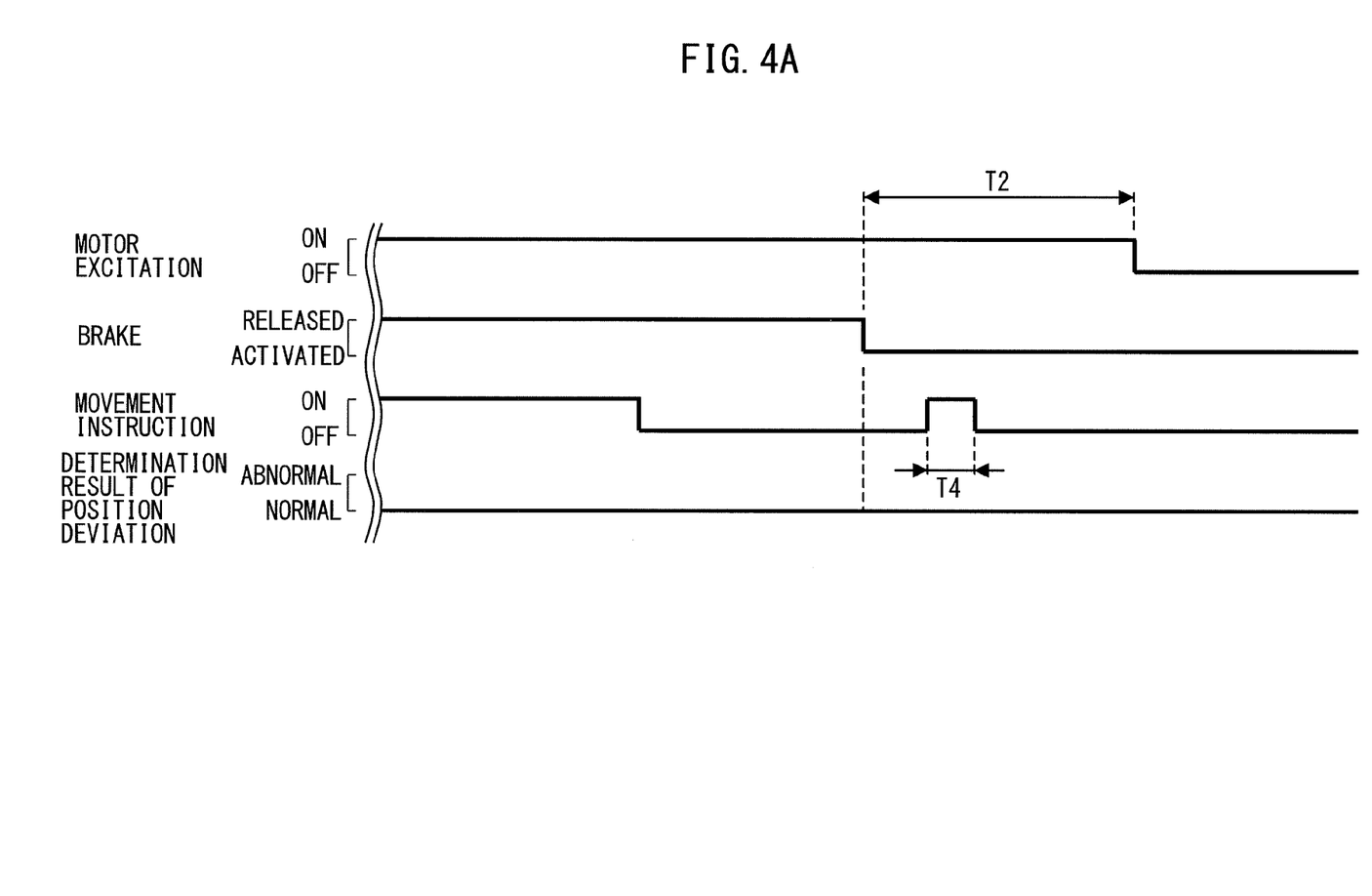
FIG. 4A is an operation-stop time chart for a robot based on the present invention.
Figure 4B:
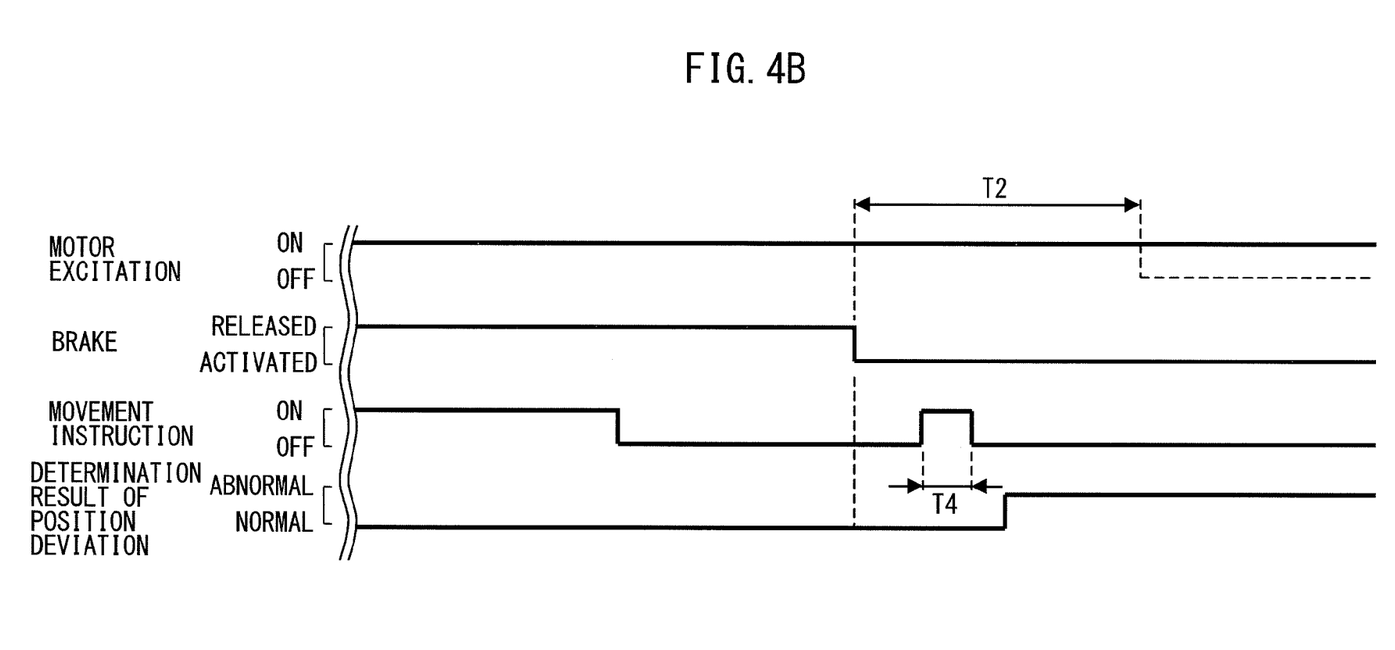
FIG. 4B is another operation-stop time chart for a robot based on the present invention.

FIG. 4A and FIG. 4B are operation-stop time charts for a robot based on the present invention. The brake abnormality diagnosis method of the present invention in the stop sequence will now be described with reference to these drawings. As depicted in FIGS. 4A and 4B, in an arbitrary short segment T4 in the segment T2, the control circuit 20 inputs, for a predetermined short period of time, a predetermined movement instruction for performing an abnormality diagnosis for the brake 31.

This movement instruction is extremely small by which the output axis of the servomotor 30 does not move if the braking torque of the brake 31 is normal while the brake 31 is activated. After the predetermined movement instruction has been input to the servomotor 30, the rotation position of the output axis of the servomotor 30 is obtained by the rotation position detector 32. The control circuit 20 performs a comparison as to whether or not a position deviation between the predetermined movement instruction and the rotation position is equal to or greater than a predetermined threshold. If the position deviation is equal to or greater than the predetermined threshold, it is determined that there is an abnormality in the brake 31. It should be noted that the abnormality diagnosis for the brake 31 may be performed by means of another method.

If it is determined that there is no abnormality in the brake 31, it is not necessary to notify the operator and, therefore, the output unit 42 is not activated. Accordingly, as depicted in FIG. 4A, the stop sequence continues in the same manner as depicted in FIG. 3.

In contrast to this, if it is determined that there is an abnormality in the brake 31, as depicted in FIG. 4B, after the segment T4, the operator is notified by way of the output unit 42 that there is an abnormality in the brake 31. As can be seen in FIG. 4B, the motor excitation remains in the ON state without being set to OFF, even after the end of the segment T2. Furthermore, the brake 31 also remains in the activated state. The reason for this is to prevent the output axis (gravity axis) of the corresponding servomotor 30 from dropping even if it has been diagnosed that there is an abnormality in the brake 31.

When the operator becomes aware of the abnormality by means of the output unit 42, the robot 1 is manually moved to a safe predetermined retreat position and posture. It should be noted that the movement to the retreat position and posture may be performed automatically. It is clear that it is therefore possible to further ensure safety.

Alternatively, if there is an abnormality in the brake 31, the operation of the robot 1 may be continued with the operating speed of the robot 1 having been decreased by a predetermined amount. In this case, the servomotor 30 is prevented from overheating, and it is therefore possible to avoid an output of a separate alarm caused by overheating.

Figure 5A:
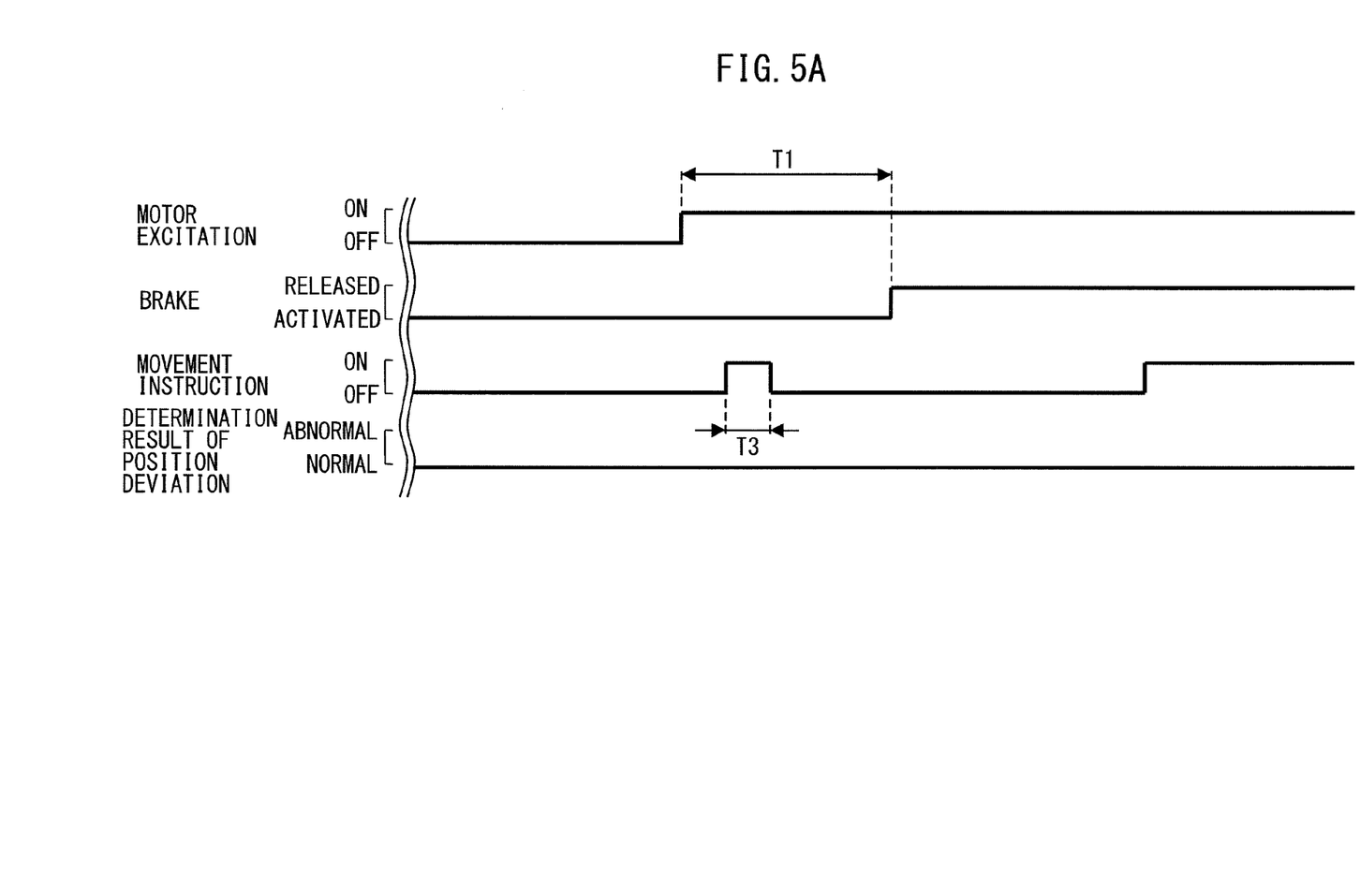
FIG. 5A is an operation-start time chart for a robot based on the present invention.
Figure 5B:
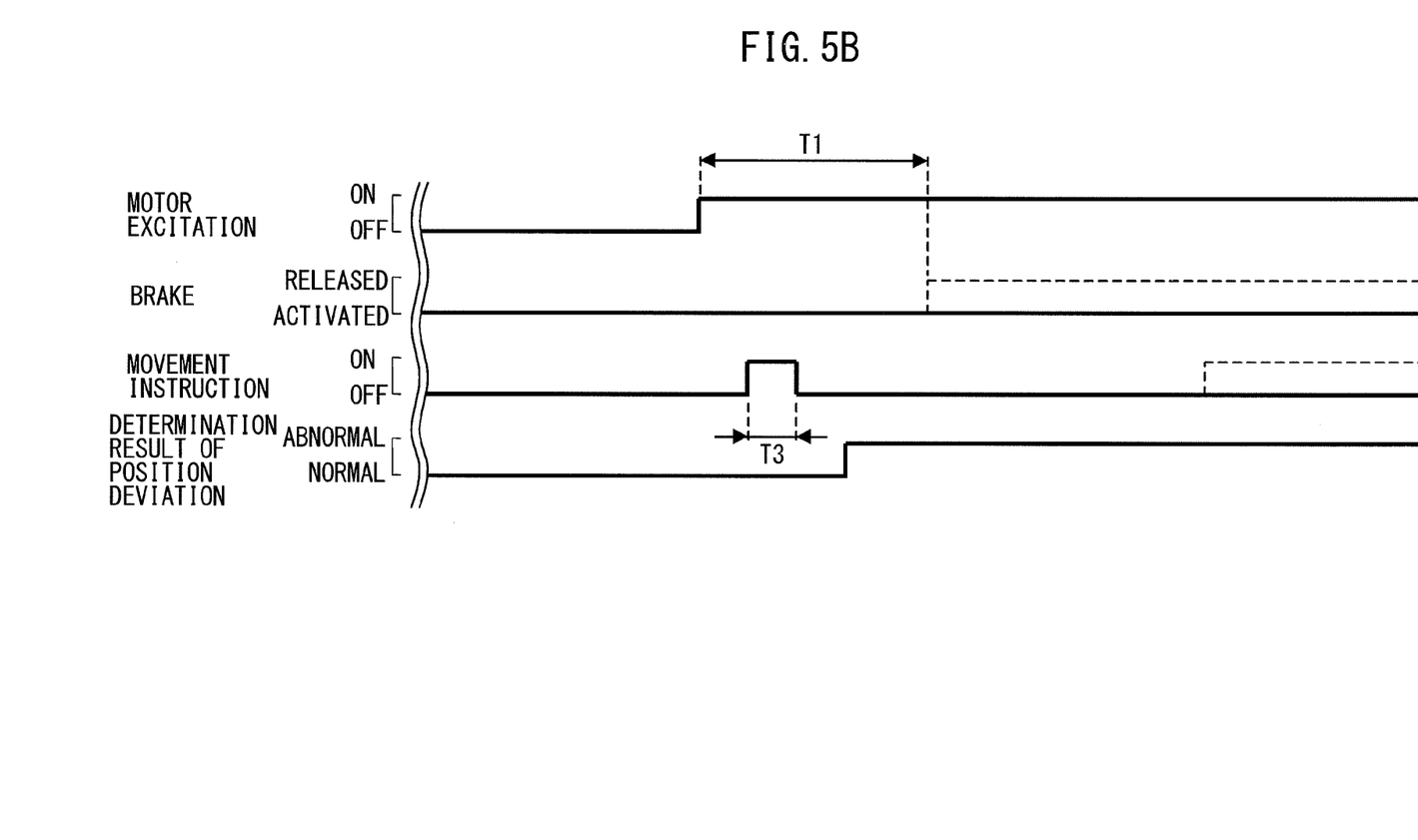
FIG. 5B is another operation-start time chart for a robot based on the present invention.

FIG. 5A and FIG. 5B are operation-start time charts for a robot based on the present invention. The brake abnormality diagnosis method of the present invention in the operation start sequence will now be described with reference to these drawings. As depicted in FIG. 5A and others, in an arbitrary short segment T3 in the segment T1, the control circuit 20 inputs the aforementioned movement instruction for a predetermined short period of time, and an abnormality diagnosis for the brake 31 is similarly performed.

If it is determined that there is no abnormality in the brake 31, it is not necessary to notify the operator and, therefore, the output unit 42 is not activated. Accordingly, as depicted in FIG. 5A, the operation start sequence continues in the same manner as depicted in FIG. 3.

In contrast to this, if it is determined that there is an abnormality in the brake 31, as depicted in FIG. 5B, after the segment T3, the operator is notified by way of the output unit 42 that there is an abnormality in the brake 31. As can be seen in FIG. 5B, the activated state is maintained without the brake 31 being released, even after the end of the segment T1. Furthermore, the motor excitation is also maintained in the ON state. The reason for this is to prevent the gravity axis from dropping in the case the output axis of the servomotor 30 is a gravity axis. Furthermore, if it is determined that there is an abnormality in the brake 31, the movement instruction is no longer output even after the end of the segment T1, and erroneous operation of the robot 1 is therefore prevented.

As can be seen in FIG. 5A and FIG. 5B, by diagnosing the abnormality in the brake 31 before the movement instruction for the robot 1 is output, the abnormality in the brake 31 can be found at an early stage. In other words, in the present invention, the abnormality in the brake 31 can be detected before a decrease in the braking torque of the brake 31 progresses.

Figure 6:
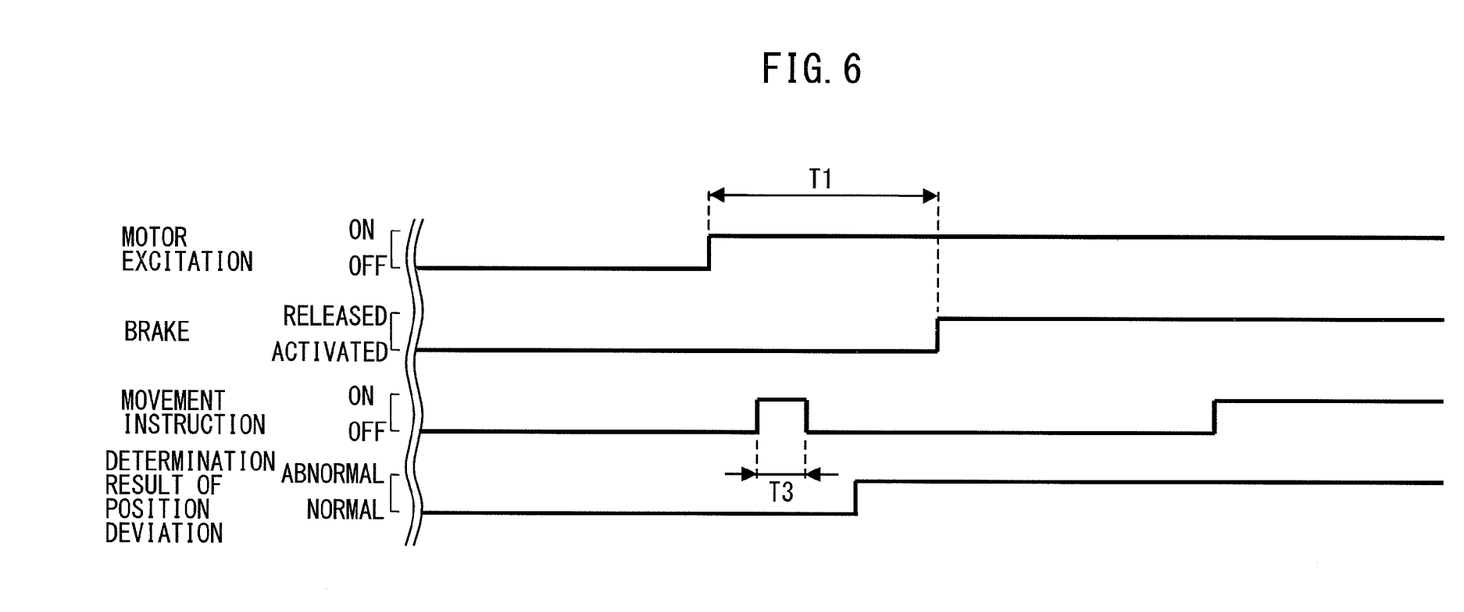
FIG. 6 is still another operation-start time chart for a robot based on the present invention.

Furthermore, as depicted in FIG. 6 which is also another operation-start time chart for a robot, the movement instruction may be output after the end of the segment T1. In this case, because the operator is in the vicinity of the robot 1, the operator is able to quickly stop the robot 1 even if the robot 1 operates in an erroneous manner. Furthermore, this approach may be applied if it is determined that the progress of the decrease in the braking torque of the brake 31 is slow.

In this way, in the present invention, the excitation of the motor 30 is not interrupted and in addition the brake 31 is not released if it is diagnosed that there is an abnormality in the brake 31. Consequently, even if the braking torque of the brake 31 has decreased, a gravity axis can be prevented from dropping. Moreover, in the present invention, diagnosis is performed on the brake while the motor 30 is excited and the brake 31 is activated, rather than when an emergency stop is performed or when power is supplied. It is therefore possible to perform diagnosis on the brake 31 each time the operation of the robot 1 is started and stopped, and it is possible to detect an abnormality in the brake 31 before the decrease in the braking torque of the brake 31 progresses.

Furthermore in the present invention, special equipment for the diagnosis of the brake 31 is not required. It is therefore clear that diagnosis can be performed on the brake 31 without having any effect on the operation time of the robot 1 or manufacturing costs.

Effects of the Invention

In the first and seventh aspects, the excitation of the motor is not interrupted and in addition the brake is not released if it is diagnosed that there is an abnormality in the brake. Consequently, a gravity axis can be prevented from dropping even if the braking torque of the brake has decreased. Furthermore, in the first and seventh aspects, diagnosis is performed on the brake while the motor is excited and the brake is activated, rather than when an emergency stop is performed or when power is supplied. It is therefore possible to perform diagnosis on the brake each time the operation of the robot or the machine tool is started and stopped, and it is possible to detect an abnormality in the brake before a decrease in the braking torque of the brake progresses.

In the second aspect, it is possible to further ensure safety because the robot or the machine tool is retreated to a safe location.

In the third aspect, the motor is prevented from overheating, and it is therefore possible to avoid an output of a separate alarm caused by overheating.

In the fourth and eighth aspects, by diagnosing an abnormality in the brake before the movement instruction for the robot or the machine tool is output, the abnormality in the brake can be found at an early stage. Furthermore, by diagnosing the abnormality in the brake after the movement instruction for the robot or the machine tool has stopped, it is possible to prevent a gravity axis from dropping even if the abnormality occurred in the brake during operation of the robot or the machine tool.

The fifth and ninth aspects can be employed in the case the operator is in the vicinity of the robot, or in the case it is determined that the progress of a decrease in the braking torque of the brake is slow.

In the sixth and tenth aspects, because special equipment for the diagnosis for the brake is not required, diagnosis for the brake can be performed without having any effect on the operation time of the robot or machine tool or the manufacturing costs.

The present invention has been described using some typical embodiments, but it can be understood that a person skilled in the art could carry out the aforementioned alterations and a variety of other alterations, omissions, or additions without deviating from the scope of the present invention.

What is claimed is:

1. A brake abnormality diagnosis method for diagnosing an abnormality in a brake of a brake-equipped motor provided in a robot or a machine tool, the method comprising:
   diagnosing whether or not there is the abnormality in the brake while the motor is excited and the brake is activated; and
   notifying the abnormality in the brake, when said diagnosing indicates that there is the abnormality in the brake, without interrupting the excitation of the motor and without releasing the brake,
   wherein
   the motor includes an output axis that is droppable under gravity when the excitation of the motor is interrupted and the brake is released,
   in response to the abnormality diagnosed in the brake, the excitation of the motor is maintained and the brake remains activated to prevent the output axis of the motor from dropping under gravity, and
   the brake abnormality diagnosis method further comprises, when said diagnosing indicates that there is the abnormality in the brake,
      continuing the operation of the robot or the machine tool while decreasing the operating speed of the robot or the machine tool by a predetermined amount.

2. The brake abnormality diagnosis method according to claim 1, wherein said diagnosing is performed on the basis of
   a predetermined movement instruction which is supplied to the motor and is previously known to be insufficient to cause the motor to move when there is no abnormality in the brake, and
   an actual position of the motor which has operated in accordance with the movement instruction.

3. A brake abnormality diagnosis method for diagnosing an abnormality in a brake of a brake-equipped motor provided in a robot or a machine tool, the method comprising:
   diagnosing whether or not there is the abnormality in the brake while the motor is excited and the brake is activated; and
   notifying the abnormality in the brake, when said diagnosing indicates that there is the abnormality in the brake, without interrupting the excitation of the motor and without releasing the brake,
   wherein
   the motor includes an output axis that is droppable under gravity when the excitation of the motor is interrupted and the brake is released,
   in response to the abnormality diagnosed in the brake, the excitation of the motor is maintained and the brake remains activated to prevent the output axis of the motor from dropping under gravity, and
   said diagnosing is performed at least before a movement instruction for the robot or the machine tool is output or after the movement instruction for the robot or the machine tool has stopped.

4. The brake abnormality diagnosis method according to claim 3, further comprising, when said diagnosing indicates that there is the abnormality in the brake,
   moving the robot or the machine tool to a safe predetermined retreat position and posture.

5. The brake abnormality diagnosis method according to claim 3, further comprising, when said diagnosing indicates that there is the abnormality in the brake before the operation of the robot or the machine tool is started,
   continuing an operation start sequence for the robot or the machine tool.

6. A brake abnormality diagnosis device for diagnosing an abnormality in a brake of a brake-equipped motor provided in a robot or a machine tool, the device comprising a control circuit,
   the control circuit comprising:
      an abnormality diagnosis unit configured to perform a diagnosis whether or not there is the abnormality in the brake while the motor is excited and the brake is activated; and
      an output unit configured to notify the abnormality in the brake, when said abnormality diagnosis unit diagnoses that there is the abnormality in the brake, without interrupting the excitation of the motor and without releasing the brake,
   wherein
   the motor includes an output axis that is droppable under gravity when the excitation of the motor is interrupted and the brake is released,
   in response to the abnormality diagnosed in the brake, the control circuit is configured to maintain the excitation of the motor and keep the brake activated to prevent the output axis of the motor from dropping under gravity, and
   the abnormality diagnosis unit is configured to perform the diagnosis at least before a movement instruction for the robot or the machine tool is output or after the movement instruction for the robot or the machine tool has stopped.

7. The brake abnormality diagnosis device according to claim 6, wherein, when said abnormality diagnosis unit diagnoses that there is the abnormality in the brake before the operation of the robot or the machine tool is started, the control circuit is configured to continue an operation start sequence for the robot or the machine tool.

8. The brake abnormality diagnosis device according to claim 6, wherein the abnormality diagnosis unit is configured to perform the diagnosis on the basis of
   a predetermined movement instruction which is supplied to the motor and is previously known to be insufficient to cause the motor to move when there is no abnormality in the brake, and
   an actual position of the motor which has operated in accordance with the movement instruction.

* * * * *